United States Patent
Khatibi et al.

(10) Patent No.: US 9,948,959 B2
(45) Date of Patent: Apr. 17, 2018

(54) DEVICE AND METHOD FOR PROCESSING A STREAM OF VIDEO DATA

(71) Applicant: Harman Becker Automotive Systems GmbH, Karlsbad (DE)

(72) Inventors: Siamak Khatibi, Farjestaden (SE); Hans-Jurgen Zepernick, Karlskrona (SE); Muhammad Imran Iqbal, Ronneby (SE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 214 days.

(21) Appl. No.: 14/746,637

(22) Filed: Jun. 22, 2015

(65) Prior Publication Data

US 2015/0373378 A1    Dec. 24, 2015

(30) Foreign Application Priority Data

Jun. 23, 2014    (EP) .................................... 14173499

(51) Int. Cl.
*H04N 19/895* (2014.01)
*G06T 15/20* (2011.01)
(Continued)

(52) U.S. Cl.
CPC ........... *H04N 19/895* (2014.11); *G06T 5/001* (2013.01); *G06T 15/04* (2013.01); *G06T 15/08* (2013.01); *G06T 15/205* (2013.01); *H04N 5/2627* (2013.01); *H04N 13/0048* (2013.01); *H04N 13/0275* (2013.01); *H04N 19/597* (2014.11);
(Continued)

(58) Field of Classification Search
CPC ............... H04N 19/895; H04N 19/597; H04N 13/0048; H04N 5/2627; H04N 13/0275; H04N 19/805; G06T 15/08; G06T 5/001; G06T 15/04; G06T 15/205; G06T 2200/04; G06T 2215/12; G06T 2207/10021
See application file for complete search history.

(56) References Cited

U.S. PATENT DOCUMENTS 6,307,567 B1    10/2001    Cohen-Or
2003/0032479 A1*    2/2003    LeMay ................... G07F 17/32
463/32

(Continued)

FOREIGN PATENT DOCUMENTS

CN    101360246 A    2/2009

OTHER PUBLICATIONS

Extended European Search Report for corresponding Application No. EP14173499.6, dated Aug. 29, 2014, 8 pages.

*Primary Examiner* — Joseph Suh
(74) *Attorney, Agent, or Firm* — Brooks Kushman P.C.

(57) ABSTRACT

A device for processing a stream of video data which comprises a sequence of frames comprises an interface configured to receive the stream of video data. A processing device is configured to create a three-dimensional environment from a frame of the sequence of frames when a freeze condition is detected. The processing device is configured to generate a series of frames from the three-dimensional environment. The series of frames represents the three-dimensional environment from a plurality of points of view. The processing device is configured to insert the generated series of frames into the sequence of frames to generate a modified sequence of frames to conceal a freeze.

15 Claims, 6 Drawing Sheets

(51) Int. Cl.
*H04N 13/02* (2006.01)
*G06T 5/00* (2006.01)
*G06T 15/04* (2011.01)
*G06T 15/08* (2011.01)
*H04N 5/262* (2006.01)
*H04N 13/00* (2018.01)
*H04N 19/597* (2014.01)

(52) U.S. Cl.
CPC ............... *G06T 2200/04* (2013.01); *G06T 2207/10021* (2013.01); *G06T 2215/12* (2013.01)

(56) References Cited

U.S. PATENT DOCUMENTS

| | | | | |
|---|---|---|---|---|
| 2005/0201471 | A1* | 9/2005 | Hannuksela | H04N 21/44004 375/240.25 |
| 2007/0160144 | A1* | 7/2007 | Lu | H04N 19/56 375/240.16 |
| 2008/0316362 | A1* | 12/2008 | Qiu | H04N 19/159 348/607 |
| 2010/0110069 | A1* | 5/2010 | Yuan | G06T 15/20 345/419 |
| 2010/0275237 | A1 | 10/2010 | Pratt et al. | |
| 2012/0063603 | A1* | 3/2012 | Evans | H04N 21/6156 381/17 |
| 2012/0170658 | A1* | 7/2012 | Anderson | H04N 19/895 375/240.16 |
| 2012/0188341 | A1* | 7/2012 | Klein Gunnewiek | H04N 13/0048 348/43 |
| 2012/0313932 | A1* | 12/2012 | Hwang | G06T 15/205 345/419 |
| 2013/0162787 | A1* | 6/2013 | Cho | H04N 13/04 348/51 |
| 2014/0016857 | A1* | 1/2014 | Richards | G06T 7/55 382/154 |
| 2014/0049536 | A1* | 2/2014 | Neuman | G06T 15/20 345/419 |
| 2014/0118512 | A1* | 5/2014 | Park | H04N 13/0447 348/54 |
| 2014/0198182 | A1* | 7/2014 | Ward | H04N 13/0011 348/43 |
| 2014/0286441 | A1* | 9/2014 | Zhang | H04N 17/004 375/240.27 |
| 2015/0254818 | A1* | 9/2015 | Li | G06T 5/006 382/275 |
| 2015/0298548 | A1* | 10/2015 | Maru | G01C 21/3697 715/234 |

* cited by examiner

DEVICE AND METHOD FOR PROCESSING A STREAM OF VIDEO DATA

CROSS-REFERENCE TO RELATED APPLICATIONS

This application claims priority to EP Application No. 14173499, filed Jun. 23, 2014, the disclosure of which is incorporated in its entirety by reference herein.

TECHNICAL FIELD

Various embodiments relate to techniques of streaming video data. Various embodiments relate to devices and methods for processing a stream of video data when freezing may occur.

BACKGROUND

Digital broadcasting systems, for example digital multimedia broadcasting (DMB) and digital video broadcasting (DVB) systems, are nowadays widely used. Such digital broadcasting systems may provide information and entertainment at home, while a user is travelling by car, train or ship, or while a user is walking around. In digital broadcasting systems, the video streams may be transmitted wirelessly and may pass through a radio frequency channel from a sender to a receiver. The radio frequency signals may be disturbed by environmental influences and may have a varying quality and may support varying transmission rates depending on the transmission distance and transmission environment. Poor reception quality as may have various reasons, including without limitation weather conditions, poor coverage of a radio communication network in certain regions such as tunnels, or interference with other radio sources.

The video data may be corrupted when the radio signals are disturbed. Various correction techniques, such as forward error correction (FEC) may be used to at least partially correct some of the errors, such as syntax errors. Nevertheless, there may be artifacts when the video data is processed and the video is output through an optical output device, such as a display screen or a video projector. Examples for artifacts include spatial artifacts or temporal artifacts. Examples for spatial artifacts include blocking, blurring or ringing.

Temporal artifacts include artifacts which can be seen only during video playback, such as flickering or jerkiness. Freezing is one of the most severe perceptual temporal artifacts. Freezing can be caused when a signal is not available or has been lost for a time-span. Freezing may also occur when the signal quality is so low that it is preferred to freeze the video on the last best received frame rather than showing a video of poor quality. Freezing is among the artifacts which are considered to most severely affect the perceived quality of a video.

SUMMARY

There is a need in the art for devices and methods which mitigate at least some of the shortcomings described above. There is in particular a need in the art for devices and methods which mitigate the problems associated with the temporal artifact of freezing.

According to exemplary embodiments of the invention, a freeze may be concealed. A three-dimensional environment may be created from a frame received before the freeze. A series of frames may be generated by rendering the three-dimensional environment. The series of frames may be inserted into a sequence of frames received in a stream of video data to conceal a freeze which would otherwise occur in the stream of video data.

The three-dimensional environment may be created from a single frame of the sequence of frames. The three-dimensional environment may be created from a last good frame received before the freeze, for example.

The series of frames may be generated such that they represent the three-dimensional environment as seen from a plurality of points of view. The plurality of points of view may be selected to be located along a pre-defined curve. At least one parameter of the pre-defined curve may be adjusted in dependence on the created three-dimensional environment. The at least one parameter may define a movement of the point of view in the three-dimensional environment in a direction parallel to an image plane of the video frames and/or in a direction perpendicular to the image plane, i.e., into and out of the scene defined by the three-dimensional environment.

According to an exemplary embodiment, a device for processing a stream of video data is provided. The stream of video data comprises a sequence of frames. The device comprises an interface configured to receive the stream of video data. The device comprises a processing device configured to create a three-dimensional environment from a frame of the sequence of frames when a freeze condition is detected for the stream of video data. The processing device is configured to generate a series of frames from the three-dimensional environment, the series of frames representing the three-dimensional environment from a plurality of points of view. The processing device is configured to insert the generated series of frames into the sequence of frames to generate a modified sequence of frames to conceal a freeze.

According to an exemplary embodiment, a method of processing a stream of video data which comprises a sequence of frames is provided. The stream of video data is received. A freeze condition is detected in the sequence of frames. When the freeze condition is detected, a three-dimensional environment is created from a frame of the sequence of frames. A series of frames is generated from the created three-dimensional environment. The series of frames represent the three-dimensional environment from a plurality of points of view. The generated series of frames is inserted into the sequence of frames to generate a modified sequence of frames which conceals a freeze.

The method may be performed using a device according to an embodiment.

Features mentioned above and features yet to be explained may not only be used in isolation or in combination as explicitly indicated, but also in other combinations. Features and embodiments of the present application may be combined unless explicitly mentioned otherwise.

BRIEF DESCRIPTION OF THE DRAWINGS

Various features of embodiments of the present application will become more apparent when read in conjunction with the accompanying drawings.

DETAILED DESCRIPTION

Figure 1:
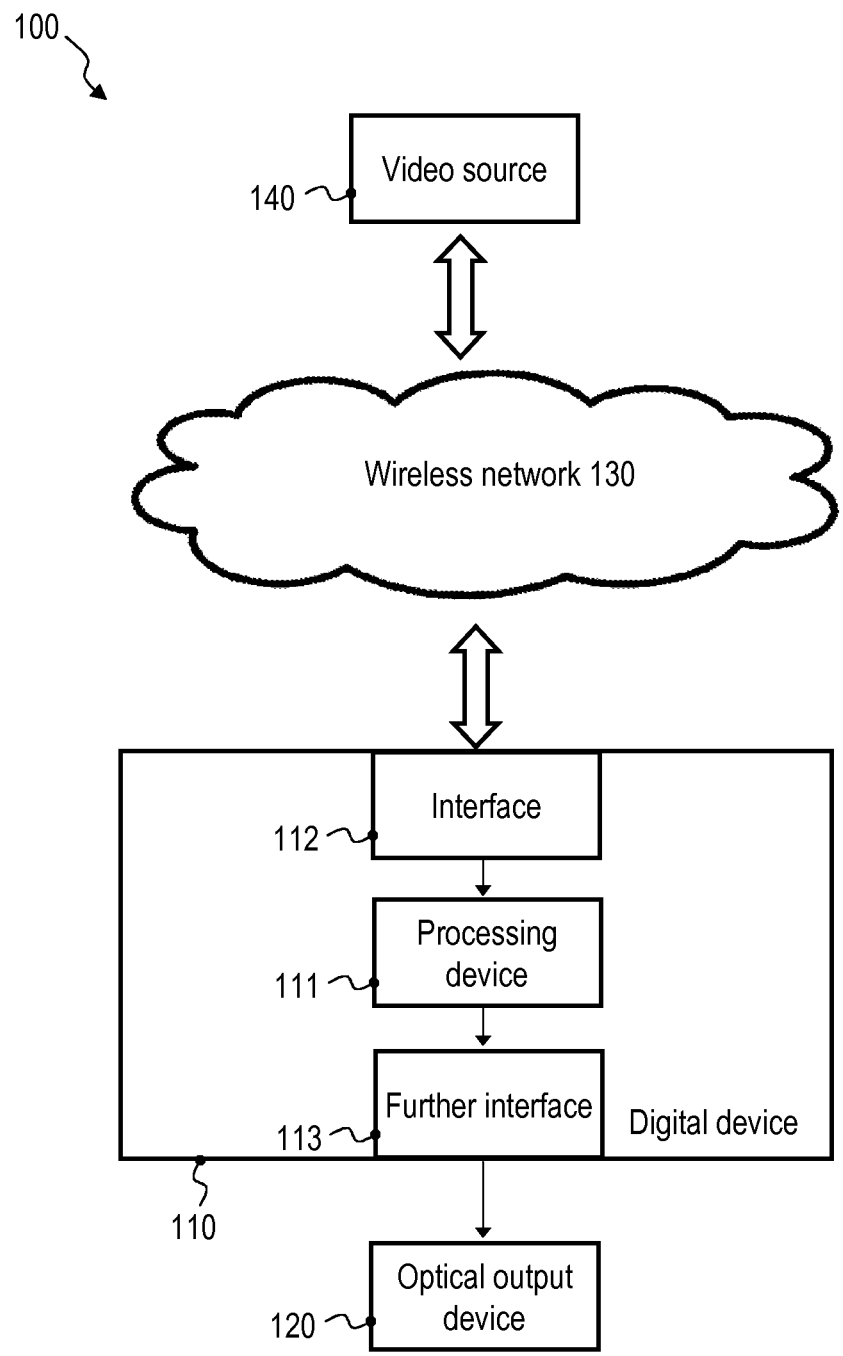
FIG. 1 is a representation of a system comprising a device according to various embodiments.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be taken demonstrative only.

The drawings are to be regarded as being schematic representations and elements illustrated in the drawings are not necessarily shown to scale. Rather, the various elements are represented such that their function and general purpose become apparent for a person skilled in the art. Any connection or coupling between functional blocks, devices, components or other physical or functional units shown in the drawings or described herein may also be implemented by an indirect connection or coupling. A coupling between components may also be established over a wireless connection, unless explicitly stated otherwise. Functional blocks may be implemented in hardware, firmware, software, or a combination thereof.

Hereinafter, techniques are described which allow a freeze to be concealed. In devices and methods according to embodiments, a freeze condition may be monitored. A freeze may be detected when no video data are received or when the received video data have a quality which is less than a target quality. The freeze condition may trigger a process in which a series of frames is generated to conceal the freeze.

The devices and methods according to embodiments may use digital data processing to generate the series of frames. Generally, the series of frames may be generated by, in a first step, creating a three-dimensional environment from one frame of the video sequence and, in a second step, by rendering plural frames from the three-dimensional environment to create the series of frames. The plural frames may be rendered such that they show the three-dimensional environment from a plurality of points of view. A movement of a virtual camera in the created three-dimensional environment may thereby be simulated.

The three-dimensional environment may be created from one frame of the video data. As used herein, the term "three-dimensional environment" refers to data representing a three-dimensional scene as shown in a frame of the video sequence. The "three-dimensional environment" may be defined by a plurality of planar surfaces which comprise at least a ground plane and which may comprise one or several vertical planes. Various techniques may be used to create the three-dimensional environment. For illustration, machine learning techniques may be used to process one frame of the received video data to identify several planar surfaces.

The series of frames which is automatically generated when a freeze condition is detected may correspond to views of the three-dimensional environment as seen from a plurality of points of views. A virtual movement of a camera along a smooth curve may be simulated thereby. One or several parameters of the curve on which the points of view are located may be set in dependence on locations of planar surfaces in the three-dimensional environment. The series of frames which is generated by computer vision techniques and which is used to conceal the freeze which would otherwise occur may thereby be automatically adapted to characteristics of the three-dimension environment which is shown in the last good frame received before the freeze condition is received, for example.

The curve may extend both in a lateral direction, parallel to an image plane of the one frame from which the three-dimensional environment is created, and in a depth direction perpendicular to this image plane. The series of frames can thereby be generated so as to simulate a movement of a virtual camera which combines a movement in the left-right direction of the image frame and a movement in the depth direction perpendicular to the image plane of the image frame.

The curve on which the plural points of view are positioned may have a curvature which varies along the curve. The curve may have a section which is linear. The curve may have at least one other section which is not linear. The curve may be generally s-shaped.

The received stream of video data may be buffered. When a freeze condition is detected, a duration for which the freeze condition exists may be determined. A number of frames included in the generated series of frames may be determined automatically and independence on the duration for which the freeze condition exists.

The freeze condition may correspond to a state in which no radio signals carrying the stream of video data are received at the device. The freeze condition may correspond to a state in which the data carried in the stream of video data is corrupted to such an extent that it is preferred not to display the corrupted image frames, and to conceal the freeze by generating the series of frames.

FIG. 1 shows a system 100 which comprises a device 110 according to an embodiment. The system 100 may be a digital multimedia broadcasting (DMB) or digital video broadcasting (DVB) system. The system 100 comprises a video source 140 for a stream of video data. The video source 140 may comprise a server which is connected to or included in a wide area network. The video source 140 may be configured to provide the stream of video data for transmission to the device 110.

The device 110 according to an embodiment may be a digital device configured to process the stream of video data. The device 110 may comprise an interface 112 to receive the stream of video data. The interface 112 may be a wireless interface. The interface 112 may be configured to receive the stream of video data transmitted over a wireless network 130. The wireless network 130 may be a cellular communication network, and the interface 112 may be configured for communication with a cellular communication network.

The device 110 comprises a processing device 111 coupled to the interface 112 to process the stream of video data. The stream of video data comprises a plurality of frames. The processing device 111 is configured to detect a freeze condition. The processing device 111 may detect that the freeze condition occurs when the stream of video data received at the interface 112 is interrupted. Alternatively or additionally, the processing device 111 may detect that the freeze condition occurs when the stream of video data has syntax errors and/or spatial artifacts which the processing device 111 cannot automatically correct. The processing device 111 may be configured to automatically determine a duration of the freeze and/or a number of frames which need to be output while the freeze condition exists. The device 110 may comprise a buffer for buffering a number of frames of the video stream, which allows the processing device 111 to determine a duration of the freeze condition and/or number of frames which must be streamed out during the freeze condition before the processing device 111 streams out the first frame affected by the freeze.

Detection of the freeze condition triggers the processing device 111 to generate a series of frames which are streamed out to conceal the freeze. The processing device 111 may be configured to generate the series of frames in a two-step process. In a first step, the processing device 111 may create a three-dimensional environment. In a second step, a series of frames are computed from the three-dimensional environment, for example, by rendering.

The processing device 111 may be configured to process a frame received in the stream of video data to create the three-dimensional environment. The processing device 111 may be configured to create the three-dimensional environment automatically and without requiring any user input. The created three-dimensional environment may comprise information on one or several planar surfaces shown in one of the frames received in the stream of video data before the freeze. The three-dimensional environment may be selected such that one frame of the stream of video data, for example, the last frame received before the freeze which fulfill a pre-defined quality criterion, can be obtained by rendering the three-dimensional environment. It should be understood that the three-dimensional environment may, but does not need to be a representation of a real-world environment in which the device 110 is presently located. The three-dimensional environment may also be a representation of a real-world environment which is located remote from the device 110 or of a computer generated environment. The created three-dimensional environment may comprise information on the locations of several planar surfaces shown in at least one frame of the sequence which was received before the freeze condition. The created three-dimensional environment may comprise additional information, such as color or texture information, for each one of the various planar surfaces.

As will be explained in more detail below, the processing device 111 may employ various techniques to create the three-dimensional environment from one frame. The processing device 111 may be configured to create the three-dimensional environment from one single frame received before the freeze condition. This allows the freeze to be concealed in a simple and efficient manner. The processing device 111 may use a statistical learning technique to determine the three-dimensional environment from one frame. Implementations according to exemplary embodiments will be described in more detail with reference to FIG. 8, FIG. 10, and FIG. 11.

The processing device 111 may be configured to generate the series of frames which are streamed out during the freeze from the three-dimensional environment. The processing device 111 may be configured to generate the series of frames using the three-dimensional environment and a number N of frames which must be streamed out as an input.

The processing device 111 may be configured to generate the series of frames such that they simulate a virtual camera movement in the time period in which the freeze condition persists. By streaming out the series of frames, the processing device 111 may conceal the freeze in the video which is output via an optical output device 120. The processing device 111 may use the last good frame received before the freeze to create the three-dimensional environment and to generate the series of frames which show the three-dimensional environment as seen from a virtual moving camera. The series of frames streamed out may therefore have less spatial and/or temporal artifacts than the frames included in the stream of video data while the freeze condition persists.

The series of frames may be created such that it mimics a virtual camera movement along a smooth curve. The curve may have several portions which have a curvature grater than zero. A curvature of the curve may vary along the curve. The series of frames may be generated by rendering the three-dimensional environment such that the series of frames represents the three-dimensional environment as seen from points of view located along the curve. A virtual camera movement along such a curve with varying curvature turned out to provide good user experience. The processing device 111 may be configured to render each frame of the series of frames from the three-dimensional environment.

The processing device 111 may be configured such that at least one frame of the series of frames generated by rendering the three-dimensional environment is different from all frames of the sequence of frames received in the stream of video data. The processing device 111 may be configured such that several frames of the series of frames generated by rendering the three-dimensional environment is different from all frames of the sequence of frames received in the stream of video data. The processing device 111 may be configured such that all frames of the series of frames generated by rendering the three-dimensional environment is different from all frames of the sequence of frames received in the stream of video data. Thereby, the impression of a virtual movement of the camera may be generated in the video output to a user.

The device 110 may comprise an optical output device 120 or may be coupled to an optical output device 120. The optical output device 120 may be a display screen or may have any one of a variety of other configurations. For illustration, the optical output device 120 may be a projector, a head-mounted display, or another display. The optical output device 120 may be installed in a vehicle. The processing device 111 may be configured to stream out video frames to the optical output device 120 through a further interface 113. For illustration, when the optical output device 120 is a display installed in a vehicle, the further interface 113 may be configured for communication over a vehicle board network. The processing device 111 may be configured to stream out frames which comprise frames received in the stream of video data before the freeze condition occurs, followed by frames generated by the processing device 111 from the created three-dimensional environment while the freeze condition exists, followed by other frames received in the stream of video data after the freeze condition is over.

The optical output device 120 may have a buffer dimensioned to respectively buffer one frame for outputting via the optical output device 120. The optical output device 120 may be configured such that the buffer stores, in a time sequential manner, a frame included in the stream of video data and a frame which is generated by the processing device 111 by rendering the three-dimensional environment.

The operation of the device 110 according to an embodiment will be described in more detail with reference to FIG. 2 to FIG. 10.

Figure 2:
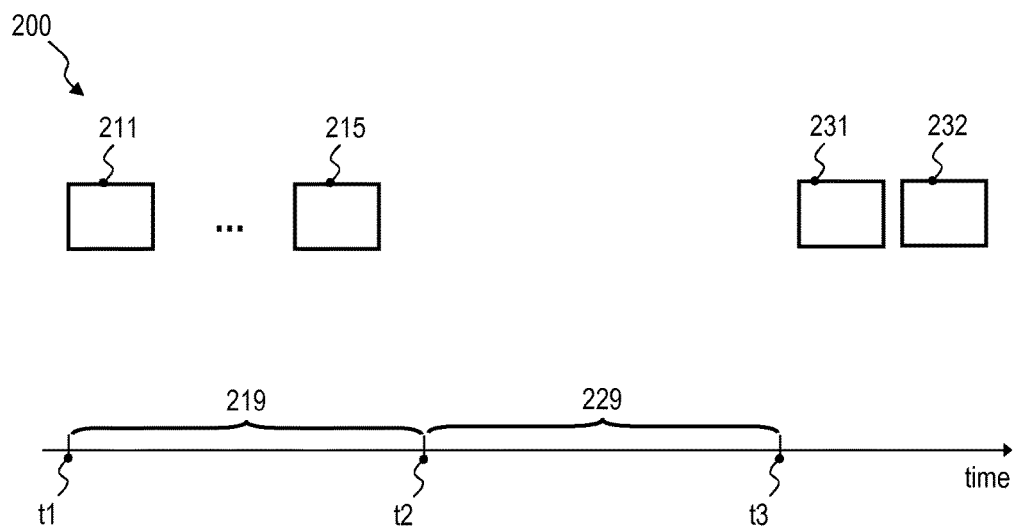
FIG. 2 shows a sequence of frames received by a device according to an embodiment.

FIG. 2 shows a sequence of frames 200 received by the device 110 according to an embodiment. The sequence of frames 200 may be received in a stream of video data which is transmitted over an air interface. The sequence of frames 200 may comprise a plurality of frames 211, 215, 231, 232. After a time interval 219 in which the frames 211, 215 are received, a freeze condition exists in another time interval 229. In the other time interval 229 the receipt of radio signals may be prevented, for example, by shielding effects as may occur in a tunnel or due to other obstructions. It is also possible that, in the time interval 229, the data in the stream of video data has syntax errors and/or spatial artifacts which are such that the processing device 111 suppresses an outputting of the video data.

In conventional approaches, the last frame 215 received before the time interval 229 in which the freeze condition exists may be displayed throughout the time interval 229. This freeze of the video is perceived as a severe quality impairment by users. To conceal the freeze, the device 110 is operative to stream out a series of computer generated frames which mimic a virtual camera movement though the three-dimensional environment shown in the last frame 215 received before the time interval 229 in which the freeze condition exists.

Figure 3:
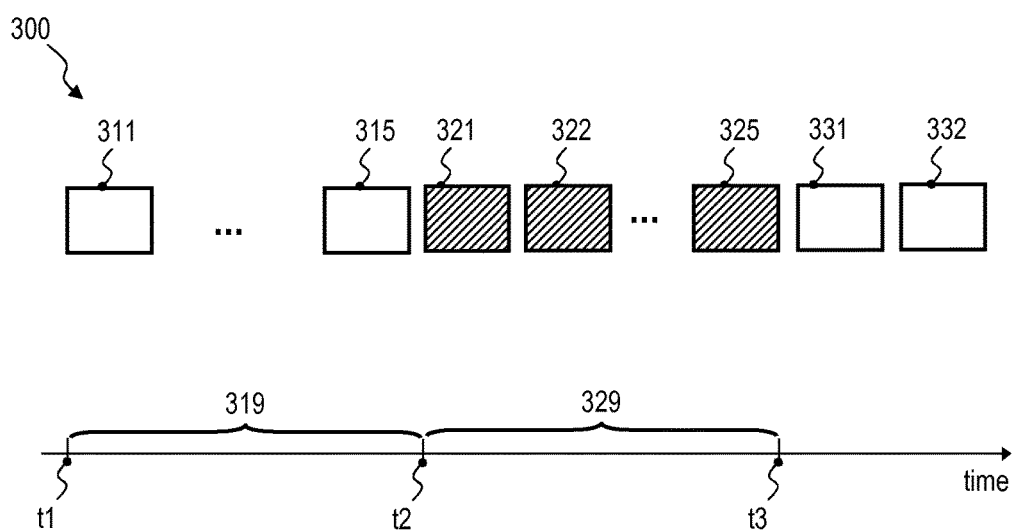
FIG. 3 shows a modified sequence of frames output by the device according to an embodiment.

FIG. 3 shows a modified sequence 300 of frames which are streamed out by the device 110 according to an embodiment. Each frame 311, 315 streamed out by the device 110 for outputting via an optical output device may respectively correspond to one of the received frames 211, 215. The frames 311, 315 may be streamed out in a time interval 319 before a freeze condition occurs. The frames 311, 315 do not need to be identical to the frames 211, 215 received by the device 110. The device 110 may process the received frame 211 to generate the frame 311 which is streamed out for outputting via an optical output device. For illustration, the device 110 may correct syntax errors and/or spatial artifacts in the received frame 211 to generate the frame 311 which is streamed out for outputting. Similarly, the device 110 may correct syntax errors and/or spatial artifacts in the received frame 215 to generate the frame 315 which is streamed out for outputting.

A freeze condition may set in at a time t2. The freeze condition may trigger the device 110 to create the three-dimensional environment. The freeze condition may trigger the device 110 to generate a series of frames 321, 322, 325 to conceal the freeze. The series of frames 321, 322, 325 may all be different from the frames received in the stream of video data. The series of frames 321, 322, 325 may be generated by rendering the three-dimensional environment. A number of frames which is generated from the three-dimensional environment may be set based on the duration of the time interval 329 in which the freeze condition exists and a frame rate of the video. The number of frames 321, 322, 325 which is generated by the processing device 111 of the device 110 may be set such that the computer-generated frames 321, 322, 325 may be streamed out at least until the freeze condition ends at a time t3.

After the freeze condition ends, the device 110 may stream out frames 331, 332 which are generated from the received frames 231, 232. The device 110 may process the received frame 231 to generate the frame 331 which is streamed out for outputting via an optical output device. For illustration, the device 110 may correct syntax errors and/or spatial artifacts in the received frame 231 to generate the frame 331 which is streamed out for outputting. Similarly, the device 110 may correct syntax errors and/or spatial artifacts in the received frame 235 to generate the frame 335 which is streamed out for outputting.

Figure 4:
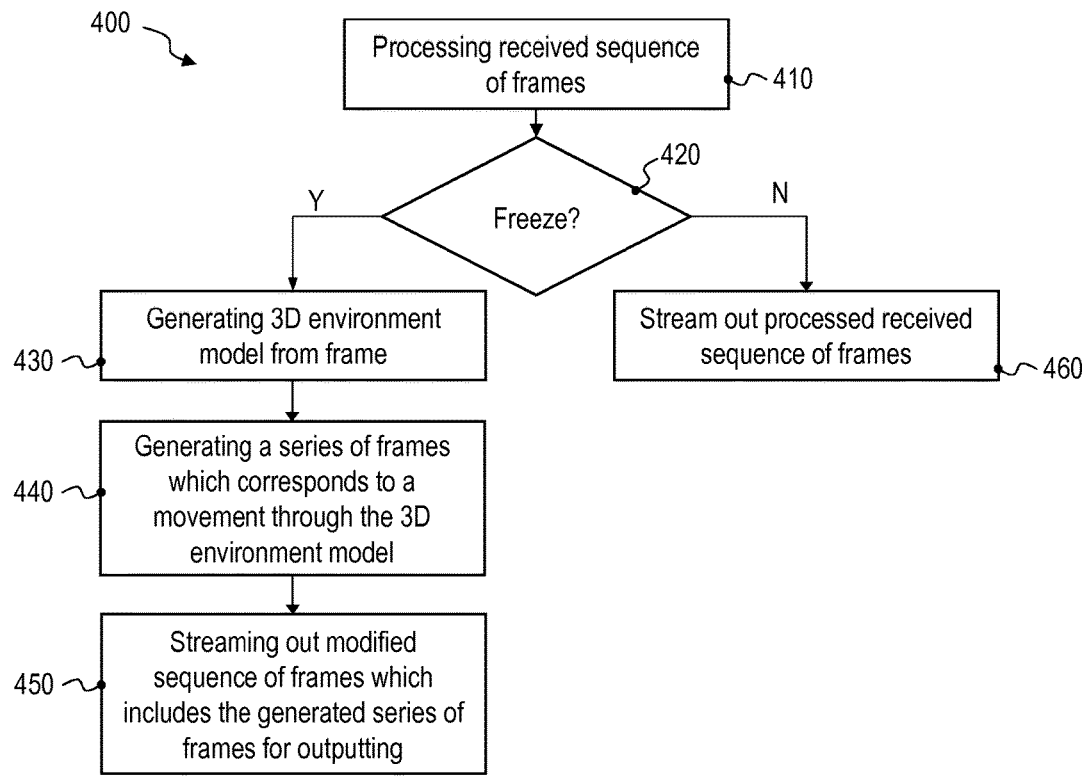
FIG. 4 is a flow chart of a method according to an embodiment.

FIG. 4 is a flow chart of a method 400 according to an embodiment. The method 400 may be automatically performed by the device 110 according to an embodiment.

At 410, the device 110 may process a stream of video data which comprises a sequence of frames. The device 110 may automatically correct syntax errors and/or spatial artifacts of received frames.

At 420, the device 110 determines whether a freeze condition is fulfilled. The freeze condition may be fulfilled when the stream of video data received by the device 110 is interrupted. Alternatively or additionally, the freeze condition may be fulfilled when the video data has syntax errors which cannot be corrected automatically by the device 110. Alternatively or additionally, the freeze condition may be fulfilled when frames of the received sequence of video have spatial artifacts such as blocking or blurring and do not fulfill a pre-defined quality criterion. If the freeze condition is not fulfilled, the method proceeds to step 460 and streams out the processed frames of the received sequence of frames. If the freeze condition is fulfilled, the method proceeds to step 430.

At 430, a three-dimensional environment is created from a frame included in received sequence of frames. The three-dimensional environment may be created from the last frame before the freeze condition which fulfills a pre-defined quality criterion, for example, from the last frame which has a quality such that it is streamed out for outputting via the optical output device. The three-dimensional environment may be created by performing image segmentation. The three-dimensional environment may be created by forming a super-pixel image and identifying solid planar surfaces in the super-pixel image.

At 440, a series of frames may be generated from the three-dimensional environment. The series of frames may be generated such that it represents a movement of a virtual camera along a pre-defined curve. To this end, the series of frames may be generated by rendering such that the frames show the three-dimensional environment as seen from a plurality of points of view located along the pre-defined curve. One or several parameters of the pre-defined curve may be set automatically in dependence on the three-dimensional environment created at step 430, as will be explained in more detail with reference to FIG. 5 and FIG. 6.

At 450, a modified sequence of frames is streamed out by the device which comprises both frames from the stream of video data and the series of frames which are computer-generated to conceal the freeze.

To conceal the freeze, the device 110 according to an embodiment may generate the series of frames such that it represents a virtual camera movement in the three-dimensional environment. The virtual camera movement may include comprise a movement in the depth-direction, i.e., perpendicular to the image plane of the frame from which the three-dimensional environment is created. The virtual camera movement may represent a camera movement along a curve which has varying curvature, for example, an S-shaped curve, and which extends both along a lateral direction and a depth direction of the image plane of the frame from which the three-dimensional environment is created.

Figure 5:
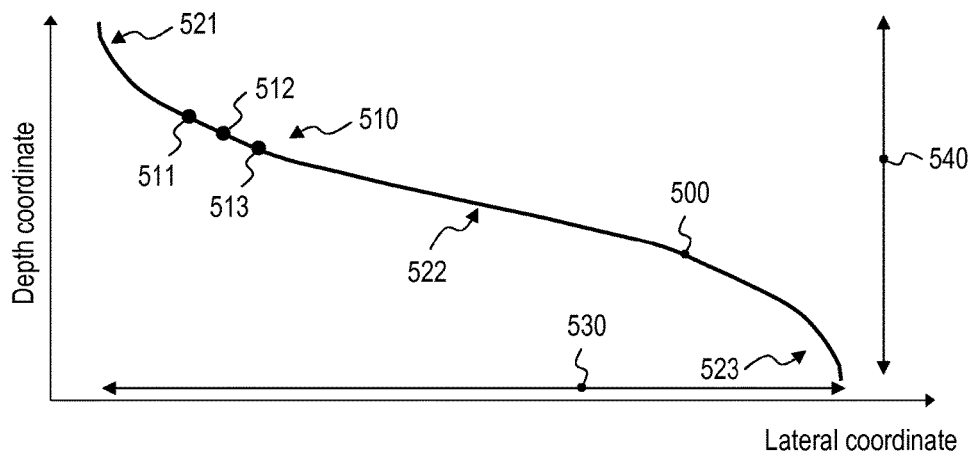
FIG. 5 illustrates a generation of frames according to a virtual camera movement to conceal a freeze.

FIG. 5 shows a curve 500 which defines the virtual camera movement in the three-dimensional environment. The curve 500 defines the position of points of view for rendering as a function of a lateral coordinate and a depth coordinate. The lateral coordinate is a coordinate along a coordinate axis which extends parallel to the image plane of the frame from which the three-dimensional environment is created. The lateral coordinate may define a position in the left-right direction, for example. The depth coordinate is a coordinate along a coordinate axis which extends perpendicular to the image plane of the frame from which the three-dimensional environment is created.

The device 110 may generate the series of frames which are streamed out to conceal the freeze by rendering the three-dimensional environment to generate the series of frames such that they show the three-dimensional environment as seen from a plurality of points of view 510 which are located on the curve 500. A first frame of the series of frames may be generated by rendering the three-dimensional environment so as to show the three-dimensional environment from a first point of view 511 located on the curve 500. A second frame of the series of frames may be generated by rendering the three-dimensional environment so as to show the three-dimensional environment from a second point of view 512 located on the curve 500. A third frame of the series of frames may be generated by rendering the three-dimensional environment so as to show the three-dimensional environment from a third point of view 513 located on the curve 500.

At least some sections of the curve 500 may have a curvature which is greater than zero. A section 521 of the curve 500 may be bent, meaning that the camera moves non-linearly in the plane defined by the lateral coordinate axis and the depth coordinate axis. Another section 522 of the curve 500 may be straight, such that the camera moves substantially linearly along the section 522 of the curve 500. Yet another section 523 of the curve 500 may be bent, meaning that the camera moves non-linearly in the plane defined by the lateral coordinate axis and the depth coordinate axis. The straight section 522 may be positioned in between the curved sections 521, 523.

The orientation of the image plane may be kept constant when rendering the three-dimensional scene. Alternatively, different image plane orientations may be used for the different points of view 511-513 to mimic a rotation of the virtual camera which combines with the movement along the curve 500.

By rendering the three-dimensional scene to mimic a movement of a virtual camera through points of view 511-513 located on the curve 500, users perceive a movement through the three-dimensional environment shown on the last good frame received before the freeze condition occurs. The quality of a video in which a freeze in concealed in this way is perceived to be better than the quality of a video in which one frame is frozen.

The curve 500 has one or several parameters. The parameter(s) may include a width 530 of the curve 500 measured parallel to the image plane of the frame from which the three-dimensional environment is created. The parameter(s) may include a length 540 of the curve 500 measured perpendicular to the image plane of the frame from which the three-dimensional environment is created. The device 110 may automatically set these parameter(s). The device 110 may set these parameter(s) in dependence on locations of planar surfaces in the three-dimensional environment. For illustration, the width 530 may be selectively increased or decreased to take depending on a spacing between vertical planar surfaces in the three-dimensional environment. The length 540 may be selectively increased or decreased, depending on location of a planar vertical surface in the three-dimensional environment. By adjusting the parameter(s) of the curve 500, the device 110 can ensure that the virtual camera movement does not traverse any solid planar surfaces. Unrealistic movements may thereby be prevented.

Figure 6:
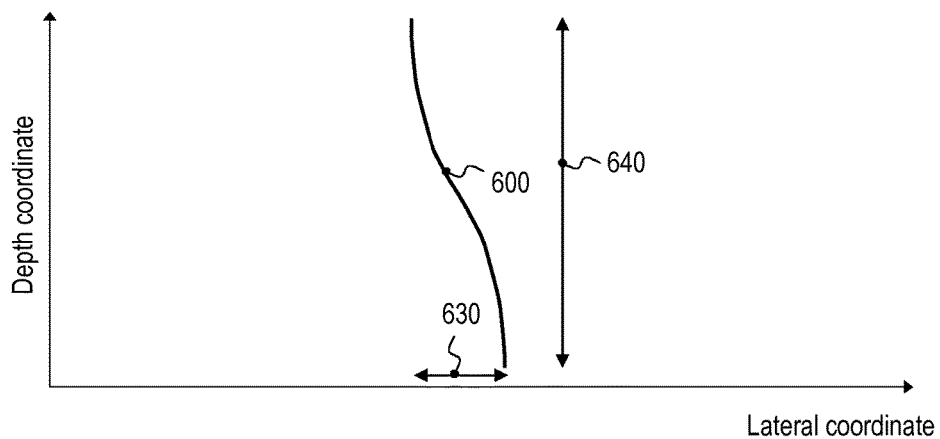
FIG. 6 illustrates a generation of frames according to a virtual camera movement to conceal a freeze.

FIG. 6 shows a curve 600 along which points of view for rendering the three-dimensional environment may be positioned. The curve 600 includes sections which have a curvature greater than zero and may also include a straight section which has a curvature of zero, as explained with reference to FIG. 5.

The curve 600 has parameters which define a width 630 of the curve 600 in the lateral direction, for example, the left-right direction, to be less than the width 530 of the curve 500. The width 630 may be selected smaller than the width 530 to take into account that vertical planes are more closely spaced in the three-dimensional environment for which the curve 600 with parameters 630, 640 is used than in the three-dimensional environment for which the curve 500 with parameters 530, 540 is used.

The adjustment of the parameters of the curve 500, 600 along which the virtual camera movement takes place may be performed depending on locations of planar surfaces, in particular in dependence on vertical planar surfaces, in the three-dimensional environment. For illustration, when the last frame before the freeze shows a scene with two rows of buildings, the lateral virtual movement 530, 630 of the camera in the series of frames may be adjusted depending on a spacing of the building walls. This ensures that the virtual camera movement does not unintentionally cross a building wall. For further illustration, when the last frame before the freeze shows a scene with a frontal wall, for example, a building wall, is arranged perpendicular to the viewing direction and parallel to the image plane, the virtual movement of the camera in the series of frames may be adjusted depending on the position of the frontal wall so as to ensure that the camera does not cross the frontal wall. The device 110 may be configured to set parameters of the curve 500, 600 so as to ensure that the curve 500, 600 does traverse solid planar surfaces of the three-dimensional environment.

Figure 7:
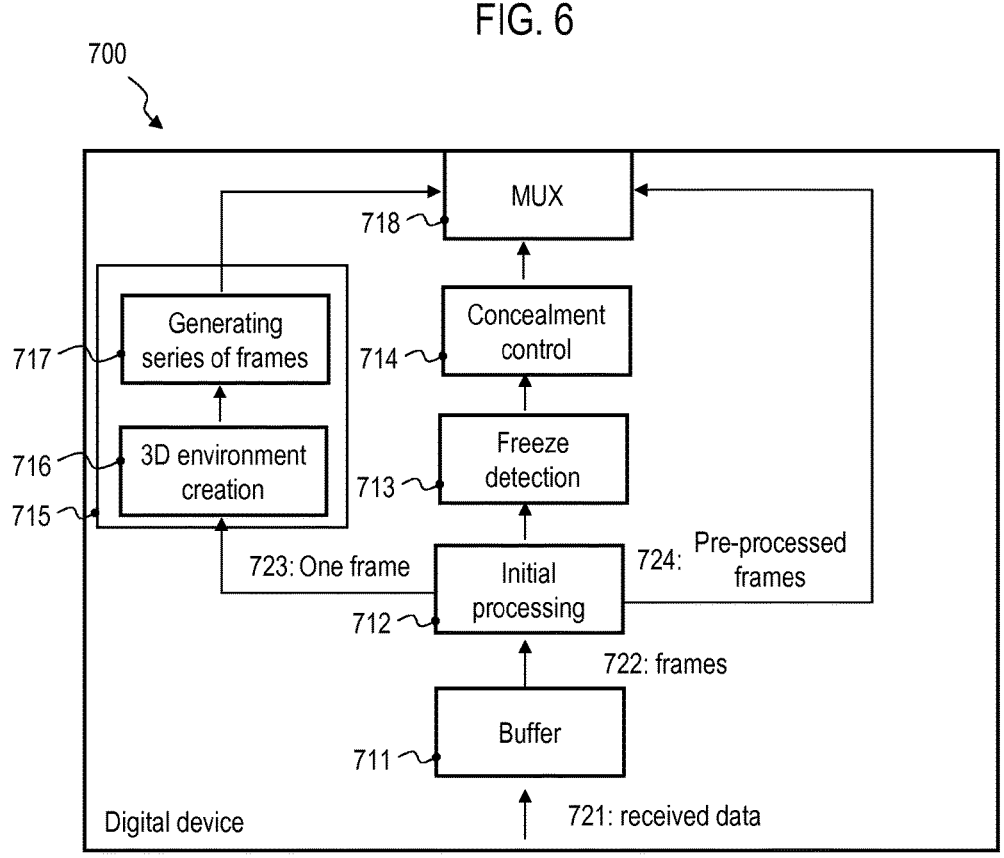
FIG. 7 is a block diagram of a device according to an embodiment.

FIG. 7 is a functional block diagram of a device 700 according to an embodiment. The device 700 may be used as device 110 in the system 100 of FIG. 1. The various functional modules of the device 700 may be implemented in software, in firmware, in hardware, or a combination thereof.

The device 700 may comprise a buffer 711. The buffer 711 may be coupled to an interface which receives a stream of video data. A received stream of video data may be buffered in the buffer 711 for further processing.

The device 700 may comprise a processing module 712 for performing an initial processing of frames 722 of the video retrieved from the buffer 711. The processing module 712 may be configured to perform a syntax error correction to correct syntax errors in received video data. The processing module 712 may be configured to at least partially correct spatial artifacts in the frames 722.

The device 700 may comprise a freeze detection module 713 which is configured to detect whether a freeze condition is fulfilled. The freeze detection module 713 may be configured to detect that the freeze condition is fulfilled when no frames 722 can be retrieved from the buffer 711. Alternatively or additionally, the freeze detection module 713 may be configured to detect that the freeze condition is fulfilled when the processing module 712 indicates that spatial artifacts cannot be corrected in a satisfactory way and/or that the processed frames do not fulfill a quality criterion.

The device 700 may comprise a freeze concealment control module 714. The freeze concealment control module 714 may determine, based on whether the freeze condition is detected, whether processed frames 724 which correspond to received frames, possibly with error correction or a series of computer-generated frames are to be output. The freeze concealment control module 714 may control a multiplexer 718, for example, which determines whether the processed frames 724 or the series of computer-generated frames are to be output.

The device 700 may comprise a freeze concealment control module 714 which generates a series of frames to conceal a freeze in the stream of video date. The freeze concealment control module 714 may be activated selectively only when the freeze condition is detected to occur. The freeze concealment control module 714 is configured to generate a series of frames which represents a virtual camera movement in the three-dimensional environment shown by one or several frames of the video stream received before the freeze.

The freeze concealment control module 714 may comprise a 3D environment creation module 716. The 3D environment creation module 716 may be configured to create a three-dimensional environment from one or several frames of the video stream received before the freeze. The 3D environment creation module 716 may be configured to identify solid planar surfaces in one frame 723 received before the freeze. The 3D environment creation module 716 may be configured to identify at least a ground plane and, if present, solid vertical planar surfaces in one frame 723 received before the freeze.

A rendering module 717 may generate the series of frames from the created three-dimensional environment. The rendering module 717 may be operative to generate the series of frames to show the three-dimensional environment from a plurality of points of view which are located along a curve 500, 600. The rendering module 717 may be configured to set one or several parameter(s) of the curve. The rendering module 717 may be configured to set one or several parameter(s) of the curve so as to ensure that the virtual camera movement does not cross a solid vertical planar surface or the ground plane surface. The rendering module 717 may receive information on the number N of frames which are to be included in the series to conceal the freeze. The movement speed of the virtual camera along the curve 500, 600 may be set by the rendering module 717 as a function of the number N of frames, for example.

The device 110, 700 may use various techniques to create the three-dimensional environment and/or to generate the series of frames from the created three-dimensional environment. For illustration, the device 110, 700 may perform an image segmentation of one frame of the video stream received before the freeze to identify objects in the frame. Alternatively or additionally, statistical learning techniques may be used by the device 110, 700 to identify the three-dimensional geometry of the scene shown in the frame of the video stream.

In some implementations, the device 110, 700 may generate a super-pixel image from a frame of the video stream to identify planar surfaces and to thereby determine the three-dimensional geometry. The super-pixels are local and coherent and preserve most of the structure necessary for the segmentation. A normalized-cuts algorithm may be employed to generate the super-pixel image. In the normalized-cuts algorithm, a weighted graph is defined wherein each point of the frame is considered to be a node and an edge is formed between every pair of nodes. For illustration, the normalized-cuts algorithm as described in J. Shi and J. Malik: "Normalized Cuts and Image Segmentation", IEEE Transactions on pattern analysis and machine learning, Vol. 22, No. 8, August 2000 may be used to create the super-pixel image. For further illustration, the normalized-cuts algorithm as described in J. R. Siddiqui, M. Havaei, S. Khatibi, and C. A. Lindley: "A Novel Plane Extraction Approach Using Supervised Learning", Machine Vision and Applications, August 2013, Volume 24, Issue 6, pp 1229-1237 may be used.

Alternatively or additionally, a learning approach to segmentation may be used by the device 110, 700. Based on color, texture and/or other features, the device 110, 700 may model the relation between the three-dimensional orientation of an object and its color or texture, for example. A categorized or labeled image may be generated from the super-pixel image. The categorized image may include information on the image regions of the frame which represent the ground plane, solid vertical planar surfaces, and/or solid horizontal vertical surfaces.

A three-dimensional scene may be created by grouping pixel information of the frame received before the freeze in accordance with the categorized or labeled image. Regions of the frame received before the freeze may be mapped onto planar surfaces according to the orientation of the surfaces which is estimated by processing the frame (e.g., using super-pixel and normalized-cuts techniques as explained above).

Figure 8:
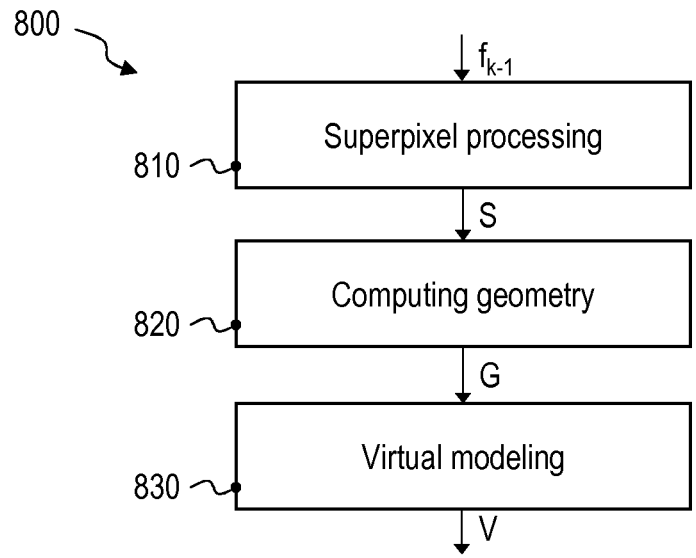
FIG. 8 is a flow chart of a procedure for creating a three-dimensional environment which may be implemented in a device and method according to an embodiment.

FIG. 8 is a flow chart of a process 800 which may be performed by the device 110, 700 to create the three-dimensional environment. The process 800 uses one frame $f_{k-1}$ received before the freeze as input.

At 810, super-pixel processing is performed to generate a super-pixel image S from the frame $f_{k-1}$. The super-pixel processing may comprise an execution of a normalized-cuts algorithm, for example.

At 820, a geometry G of the three-dimensional environment is computed. Computing the geometry may comprise identifying orientations of planar surfaces. Various techniques known in the art may be used to identify the orientations of planar surfaces, for example, supervised learning, machine learning or other automated learning techniques. Color, texture and/or homogeneity may be used to identify the regions which have the same orientation and therefore belong to the same planar surface and to determine the orientation of the regions.

At 830, the geometry G in combination with pixel values of the frame $f_{k-1}$ is used to create the three-dimensional environment. Pixel values of the frame $f_{k-1}$ may be grouped in accordance with the regions of the planar surfaces defined by the geometry G. For illustration, pixel values of the frame $f_{k-1}$ may define a texture for at least some of the planar surfaces defined by the geometry G.

The three-dimensional environment V may be used to generate a plurality of frames which show a virtual movement of a camera through the three-dimensional environment.

Figure 9:
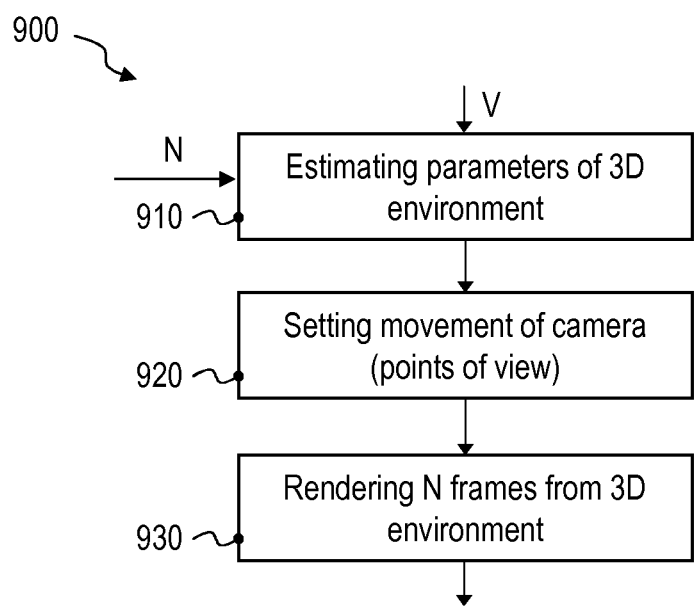
FIG. 9 is a flow chart of a procedure for generating frames which may be implemented in a device and method according to an embodiment.

FIG. 9 is a flow chart of a process 900 which may be performed by the device 110, 700 to generate a series of frames which may be inserted into an output stream of frames to conceal a freeze. The process 900 uses a three-dimensional environment V as an input. Optionally, the number N of frames which must be generated may be determined in advance and may also be used as an input for the process 900.

At 910, parameters of the three-dimensional environment may be estimated. This may comprise estimating a spacing between vertical planar surfaces. Alternatively or additionally, a distance of a frontal vertical surface from the image plane in the frame $f_{k-1}$ may be estimated.

At 920, a movement path of a camera in the three-dimensional environment may be set. This may comprise setting one or several parameters of a pre-defined curve along which defines the movement path of the camera. The movement path may be set depending on the parameters of the three-dimensional environment. The movement path may be set so as to ensure that the movement path does not cross any solid planar vertical surface or ground surface of the three-dimensional environment.

At 930, N frames may be rendered to generate a series of frames. The points of view of the series may be located along the movement path which is set at step 920, as was explained in more detail with reference to FIG. 5 and FIG. 6.

The generation of a three-dimensional environment and the determination of the geometry of the scene shown by a frame of the received video stream will be explained in more detail with reference to FIG. 10 and FIG. 11.

Figure 10:
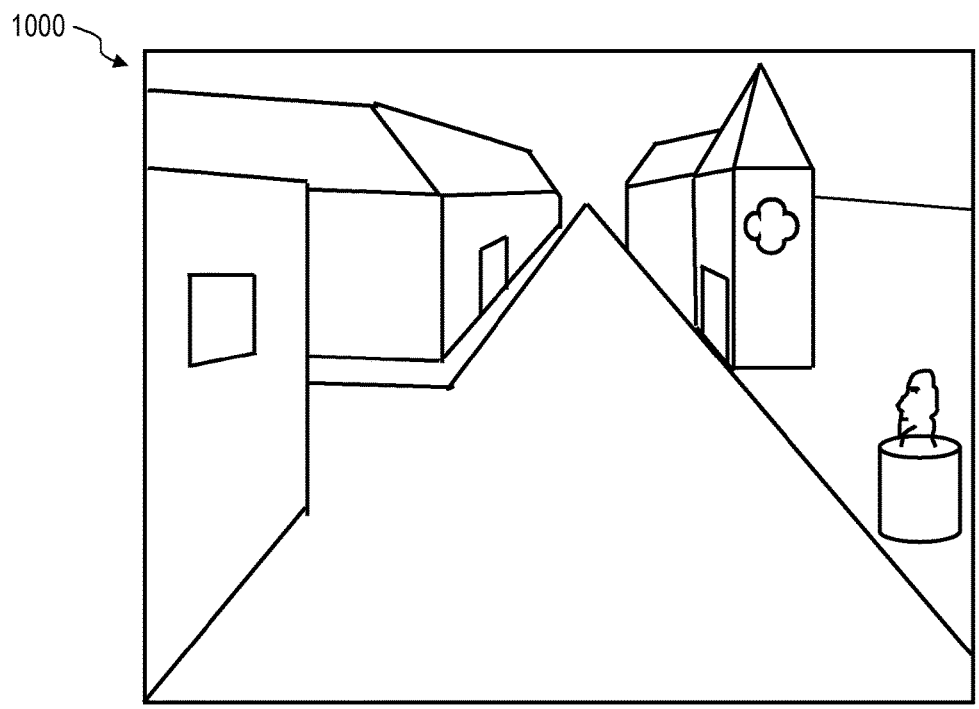
FIG. 10 illustrates a frame received before a freeze.

FIG. 10 shows an exemplary frame 1000. The frame 1000 may be the last good frame received by the device 110, 700 before a freeze.

Figure 11:
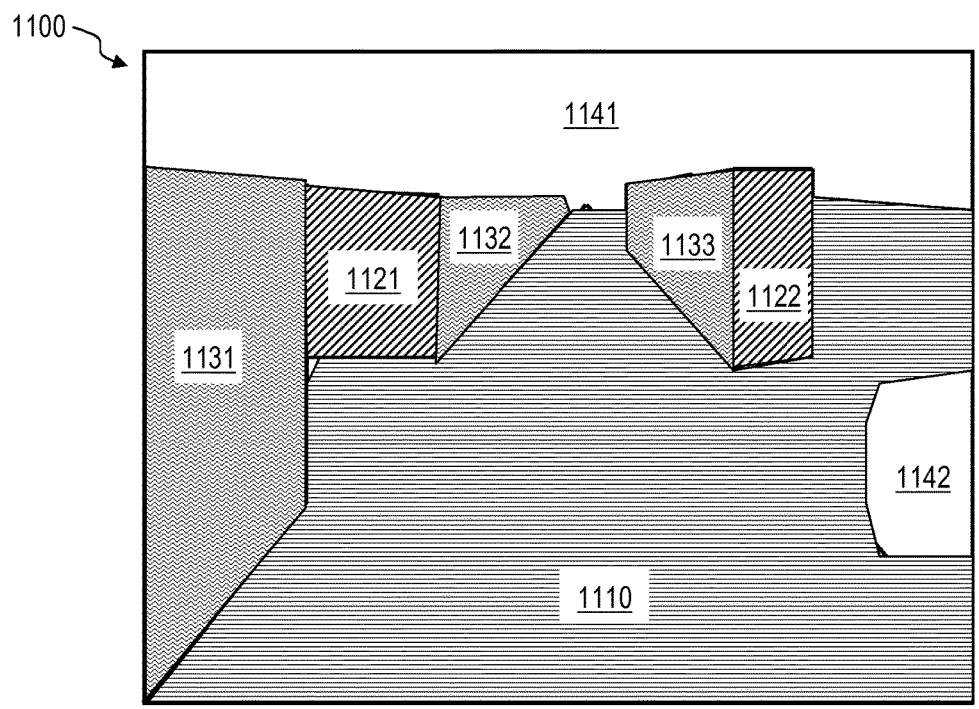
FIG. 11 illustrates a processing of the frame of FIG. 10 which may be implemented in a device and method according to an embodiment.

FIG. 11 illustrates a categorized image 1100 obtained by automatically processing the frame 1000 to create the three-dimensional environment. Different regions or categories are indicated by different patterns in FIG. 11.

The processing device 110, 700 may detect a region 1110 which represents a ground plane surface in the frame 1000.

The processing device 110, 700 may optionally detect one or several regions 1121, 1122 which represent frontal vertical planar surfaces. The frontal vertical planar surfaces 1121, 1122 may be oriented parallel to the image plane of the image 1000, for example, or may be oriented at an angle relative to a viewing direction of the image 1000.

The processing device 110, 700 may optionally detect one or several regions 1131-1133 which represent solid vertical planar surfaces. The solid vertical planar surfaces 1131-1133 may be oriented such that they are not parallel the image plane of the image 1000, for example.

The processing device 110, 700 may optionally detect a region 1141 above a horizon line.

The processing device 110, 700 may optionally detect other regions 1142 which do not fall within one of the aforementioned categories, such as non-planar surfaces.

The categorized image 1100 may be obtained by image segmentation of the frame 1000. For illustration, super-pixel processing in combination with an automatic labeling of different regions in the super-pixel image may be used to determine the various regions 1110, 1121, 1122, 1131-1133, 1141, and 1142 in the frame 1000. Other techniques known in the art may be used to process one frame to obtain information on the three-dimensional geometry of the scene shown by the frame. The pixel values of the frame 1000 may be grouped in accordance with the regions 1110, 1121, 1122, 1131-1133, 1141, 1142 to obtain texture and color information for the various regions, for example.

While embodiments of the invention have been described with reference to the drawings, modifications and alterations may be implemented in other embodiments. For illustration, other techniques may be used to create a three-dimensional environment which represents one or several frames of a video stream and/or to generate a series of frames from the three-dimensional environment.

While embodiments of the invention may be used in digital multimedia broadcasting (DMB) and digital video broadcasting (DVB) systems, the devices and methods may also be used in a wide variety of other scenarios. In particular, the operation of the devices and methods according to embodiments is not limited to a particular multimedia or video broadcasting standard.

Devices, networks, and methods according to embodiments may be used for processing video streams for outputting via an optical output device and may be particularly suitable for use in association with mobile devices, without being limited thereto.

Although the invention has been described with respect to certain preferred embodiments, various modifications will occur to the person skilled in the art. The invention is only limited by the scope of the appended claims.

What is claimed is:

1. An apparatus for processing a stream of video data which comprises a sequence of frames, comprising:
    a digital device including:
        an interface configured to receive the stream of video data; and
        a buffer coupled to the interface to buffer the stream of video data;
        wherein the digital device is configured to:
            create a three-dimensional environment from a frame of the sequence of frames in response to detecting a freeze condition;
            generate a series of frames from the three-dimensional environment, the series of frames representing the three-dimensional environment from a plurality of points of view; and
            insert the generated series of frames into the sequence of frames to generate a modified sequence of frames to conceal a freeze;
        wherein the digital device is configured to set the plurality of points of view such that the plurality of points of view are located on a pre-defined curve;
        wherein the pre-defined curve has at least one parameter and the digital device is configured to set the at least one parameter of the pre-defined curve as a function of the three-dimensional environment; and
        wherein the digital device is configured to set the at least one parameter of the pre-defined curve based on locations of planar surfaces in the three-dimensional environment.

2. The apparatus of claim 1,
    wherein the digital device is configured to create the three-dimensional environment from only one frame of the sequence of frames.

3. The apparatus of claim 2,
    wherein the digital device is configured to determine the three-dimensional environment from:
        a last frame in the sequence of frames received before the freeze; or
        a first frame in the sequence of frames during the freeze.

4. The apparatus of claim 1,
    wherein the digital device is configured to set the at least one parameter of the pre-defined curve such that the curve has a curvature which varies along the curve.

5. The apparatus of claim 1,
    wherein the digital device is configured to set the plurality of points of view as a function of a duration of the freeze condition.

6. The apparatus of claim 5,
wherein the digital device is configured to set a distance between at least two adjacent points of view along the curve as a function of the duration of the freeze condition.

7. The apparatus of claim 1, further comprising:
an optical output device,
wherein the digital device is coupled to the optical output device to output the modified sequence of frames to conceal the freeze.

8. The apparatus of claim 1, further comprising:
a further interface for coupling the device to a vehicle board network,
wherein the digital device is coupled to the further interface to output the modified sequence of frames to conceal the freeze.

9. The apparatus of claim 1,
wherein the interface is a wireless interface.

10. The apparatus of claim 1,
wherein the three-dimensional environment is defined by a plurality of planar surfaces which comprise a ground plane.

11. A method of processing a stream of video data which comprises a sequence of frames, the method comprising:
receiving the stream of video data;
detecting a freeze condition;
when detecting the freeze condition,
creating a three-dimensional environment from a frame of the sequence of frames;
generating a series of frames from the three-dimensional environment, the series of frames representing the three-dimensional environment from a plurality of points of view; and
inserting the generated series of frames into the sequence of frames to generate a modified sequence of frames which conceals a freeze;
setting the plurality of points of view such that the plurality of points of view are located on a pre-defined curve which has at least one parameter; and
setting the at least one parameter of the pre-defined curve based on locations of planar surfaces in the three-dimensional environment.

12. The method of claim 11,
wherein the plurality of points of view is set as a function of a duration of the freeze condition.

13. The method of claim 11,
wherein the three-dimensional environment is created from:
a last frame in the sequence of frames received before the freeze; or
a first frame in the sequence of frames during the freeze.

14. The method of claim 12, further comprising:
setting the at least one parameter of the pre-defined curve such that the curve has a curvature which varies along the curve.

15. An apparatus for processing a stream of video data which comprises a sequence of frames, comprising:
a digital device including:
an interface configured to receive the stream of video data; and
a buffer coupled to the interface to buffer the stream of video data;
wherein the digital device is configured to:
create a three-dimensional environment from a frame of the sequence of frames in response to detecting a freeze condition;
generate a series of frames from the three-dimensional environment, the series of frames representing the three-dimensional environment from a plurality of points of view; and
insert the generated series of frames into the sequence of frames to generate a modified sequence of frames to conceal a freeze;
wherein the digital device is configured to set the plurality of points of view such that the plurality of points of view are located on a pre-defined curve;
wherein the digital device is configured to set the plurality of points of view as a function of a duration of the freeze condition; and
wherein the digital device is configured to set a distance between at least two adjacent points of view along the curve as a function of the duration of the freeze condition.

* * * * *